United States Patent

Goto

(10) Patent No.: US 8,564,877 B2
(45) Date of Patent: Oct. 22, 2013

(54) PHOTONIC BANDGAP FIBER AND FIBER AMPLIFIER

(75) Inventor: Ryuichiro Goto, Sakura (JP)

(73) Assignee: Fujikura Ltd., Tokyo (JP)

( * ) Notice: Subject to any disclaimer, the term of this patent is extended or adjusted under 35 U.S.C. 154(b) by 474 days.

(21) Appl. No.: 12/430,346

(22) Filed: Apr. 27, 2009

(65) Prior Publication Data

US 2009/0207483 A1     Aug. 20, 2009

Related U.S. Application Data

(63) Continuation of application No. PCT/JP2008/052717, filed on Feb. 19, 2008.

(30) Foreign Application Priority Data

| Apr. 6, 2007 | (JP) | 2007-100495 |
| Jul. 27, 2007 | (JP) | 2007-196021 |
| Dec. 3, 2007 | (JP) | 2007-312869 |

(51) Int. Cl.
*H04B 10/17* (2011.01)
*G02B 6/036* (2006.01)

(52) U.S. Cl.
USPC ............... 359/341.1; 385/126; 385/127

(58) Field of Classification Search
USPC .................. 385/126, 127; 359/341.1, 341.3
See application file for complete search history.

(56) References Cited

U.S. PATENT DOCUMENTS

| 6,404,966 B1 * | 6/2002 | Kawanishi et al. ........... 385/125 |
| 6,831,934 B2 * | 12/2004 | Wang et al. ........................ 372/6 |
| 7,272,287 B2 * | 9/2007 | Bise et al. ..................... 385/123 |
| 7,340,140 B1 * | 3/2008 | Xu et al. ....................... 385/125 |
| 2001/0026667 A1 * | 10/2001 | Kawanishi et al. ........... 385/125 |
| 2003/0086668 A1 * | 5/2003 | Kliner et al. .................. 385/123 |
| 2004/0175084 A1 * | 9/2004 | Broeng et al. ................ 385/125 |
| 2004/0263856 A1 | 12/2004 | Willig et al. |
| 2006/0177187 A1 * | 8/2006 | Williams et al. .............. 385/123 |
| 2006/0257071 A1 * | 11/2006 | Bise et al. ........................ 385/29 |

FOREIGN PATENT DOCUMENTS

| EP | 1441244 A1 | 7/2004 |
| JP | 3072842 B2 | 8/2000 |
| JP | 2001-318260 A | 11/2001 |

(Continued)

OTHER PUBLICATIONS

Limpert et al. "High-Power Ultrafast Fiber Laser Systems", IEEE Journal of Selected Topics in Quantum Electronics, vol. 12, No. 2, Mar. 2006.*

(Continued)

*Primary Examiner* — Eric Bolda
(74) *Attorney, Agent, or Firm* — Sughrue Mion, PLLC

(57) ABSTRACT

A photonic bandgap fiber includes a core of a solid material; a first cladding provided around the core; a low-refractive-index region provided in a part of a core vicinity portion of the first cladding and whose average refractive index is lower than that of the core; and a periodic structure region that is arranged in another part of the core vicinity portion of the first cladding which is made of a great many high-refractive-index portions whose refractive index is higher than that of the first cladding arranged in a periodic structure. According to the invention, it is possible to provide a photonic bandgap fiber which, when arranged in a double-clad structure, enables pump light to efficiently pump signal light.

13 Claims, 7 Drawing Sheets

(56) References Cited

FOREIGN PATENT DOCUMENTS

| JP | 2004-252057 A | 9/2004 |
| WO | 02-101429 A2 | 12/2002 |
| WO | 03/038486 A2 | 5/2003 |

OTHER PUBLICATIONS

Wang et al. "Three-level Neodymium Fiber Laser Incorporating Photonic Bandgap Fiber", Conference on Lasers and Electro-optics (May 21-26, 2006).*

Ryuichiro Goto, et al, "Silicia-Based Wide-Band Solid Photonic Band-Gap Fiber", IEICE Technical Report, Aug. 2006, pp. 39-42, vol. 106, No. 210.

L. Lavoute, et al., "Design of microstructured single-mode fiber combining large mode area and high rare earth ion concentration", Optics Express, 2006, pp. 2994-2999, vol. 14, No. 7.

Limin Xiao, et al., "Photonic crystal fibers confining light by both index-guiding and bandgap-guiding: hybrid PCFs", Optics Express, 2007, pp. 15637-15647, vol. 14, No. 24.

Arismar Cerqueira S. Jr., et al., "Hybrid photonic crystal fiber", Optics Express, 2006, pp. 926-931, vol. 14, No. 2.

* cited by examiner

PHOTONIC BANDGAP FIBER AND FIBER AMPLIFIER

TECHNICAL FIELD

The present invention relates to a photonic bandgap fiber, and particularly relates to a fiber that, when used as a double-clad fiber for optical amplification, can increase the pumping efficiency, and a fiber amplifier that uses the fiber.

CROSS REFERENCE TO RELATED APPLICATIONS

This application is a Continuation of International Application No. PCT/JP2008/052717 filed Feb. 19, 2008, claiming priority based on Japanese Patent Application No. 2007-100495 filed Apr. 6, 2007, Japanese Patent Application No. 2007-196021 filed Jul. 27, 2007, and Japanese Patent Application No. 2007-312869 filed Dec. 3, 2007, the contents of all of which are incorporated herein by reference in their entirety.

BACKGROUND ART

Recently, a high-power fiber laser that uses a rare-earth doped optical fiber has been attracting attention. In a high-power fiber laser, as pump light and signal light propagate along a fiber, excited rare-earth ions amplify the signal light; the laser is also advantageous in that it is easy to cool during operation and can be made smaller.

An amplification fiber for use in such a high-power fiber laser has a double-clad structure in order to launch high-power pump light. FIG. 1 is a cross-sectional view of an example of a fiber having a double-clad structure. The double-clad fiber 1 in FIG. 1 has a two-layer cladding structure that includes a first cladding 12 and a second cladding 13 arranged around a core 11. The first cladding 12 acts as a cladding for the core where signal light is guided to, and the second cladding 13 acts as a cladding when the pump light is guided in multi-mode through the entire first cladding 12. Since the first cladding 12 normally has a diameter equal to or more than 100 μm, the launch efficiency of the pump light can be increased.

Furthermore, for a high-power fiber laser, a fiber that has a wavelength filter effect is demanded to propagate signal light intended for transmission, while suppressing propagation of light at wavelengths other than the signal light, e.g. amplified spontaneous emission (ASE) and stimulated Raman scattering. As a fiber having such an effect, there is proposed a photonic bandgap fiber which only guides light in a predetermined wavelength by Bragg reflection by disposing a periodic structure around the core. As disclosed in Patent Documents 1 and 2 and Non-Patent Document 1, particularly useful is a solid-core photonic bandgap fiber having a core that is entirely made of a solid material; this fiber allows easy fusion splicing, and can be used as an amplification fiber by doping the core with a rare-earth element. FIG. 2 is a cross-sectional view of an example of a conventional solid-core photonic bandgap fiber, where reference numeral 2 represents a solid-core photonic bandgap fiber, 21 represents a core, 22 represents a cladding, and 23 represents high-refractive-index portions having a higher refractive index than the cladding. The solid-core photonic bandgap fiber 2 includes a great many high-refractive-index portions 23 which are arranged in a periodic structure around the region of the core 21, and guides light by Bragg reflection.

[Patent Document 1] Japanese Patent Publication No. 3072842
[Patent Document 2] WO02/101429 Pamphlet
[Non-Patent Document] 'Design of microstructured single-mode fiber combining large mode area and high rare earth ion concentration' Optics express, vol. 14, No. 7, pp. 2994, 2006.

DISCLOSURE OF THE INVENTION

Problem to be Solved by the Invention

However, when a conventional solid-core photonic bandgap fiber is configured with a double-clad structure and pump light is launched into the first cladding, problems such as the following arise.

When a solid-core photonic bandgap fiber is configured with a double-clad structure, since a medium having a larger refractive index than that of the first cladding forms a periodic structure in the first cladding, some of the pump light launched into the first cladding is guided by index guiding in the periodic structure of the first cladding, and is not transmitted to the core. Consequently, the pump light cannot be used for amplifying the signal light in the core.

In particular, when there is no amplification medium throughout the entire core and an amplification medium exists only at a central section of the core, since some of the light, that is guided by index guiding in the periodic structure of the first cladding and leaks near to the core, is not absorbed into the core, the light that is guided by index guiding in the periodic structure of the first cladding becomes completely useless for amplification.

The condition is more severe when the wavelength and incidence angle of the pump light to the first cladding are such that the photonic bandgap effect occurs. Some of the pump light that is incident from the outside of the periodic structure of the first cladding cannot reach the core from the first cladding due to the photonic bandgap effect, and the pump light cannot be used for amplifying the signal light in the core.

Therefore, when a conventional solid-core photonic bandgap fiber is arranged in a double-clad structure, there is a problem that pump light cannot be efficiently used in pumping the signal light.

The present invention has been realized in view of the above, and aims to provide a solid-core photonic bandgap fiber which, when arranged in a double-clad structure, can use pump light to efficiently pump signal light.

Means for Solving the Problem

To achieve the above objects, the invention provides a photonic bandgap fiber which is provided with a core of a solid material, a first cladding provided around the core, a low-refractive-index region provided in a part of a core vicinity portion of the first cladding and whose average refractive index is lower than that of the core, and a periodic structure region that is arranged in another part of the core vicinity portion of the first cladding which is made of a great many high-refractive-index portions whose refractive index is higher than that of the first cladding arranged in a periodic structure.

Preferably in the photonic bandgap fiber of the invention, the refractive index of the core is equal to or lower than the refractive index of the first cladding.

Preferably in the photonic bandgap fiber of the invention, the great many high-refractive-index portions of the periodic structure are arranged at least in one of a one-dimensional periodic structure, a triangular lattice structure, a honeycomb lattice structure, a square lattice structure, and a rectangular lattice structure.

Preferably in the photonic bandgap fiber of the invention, there are no air holes in the first cladding.

Preferably in the photonic bandgap fiber of the invention, the cross-sectional structure has only two-fold or fewer rotational symmetries, and functions as a polarization-maintaining fiber or a single-polarization fiber.

Preferably in the photonic bandgap fiber of the invention, stress-applying parts are provided in the core vicinity portion of the first cladding, and this photonic bandgap fiber functions as a polarization-maintaining fiber or a single-polarization fiber.

Preferably in the photonic bandgap fiber of the invention, the high-refractive-index portions function as stress-applying parts, and stress-applying parts are not separately provided.

Preferably in the photonic bandgap fiber of the invention, the cross-sectional structure has three-fold rotational symmetry or higher, and there is no birefringence.

Preferably in the photonic bandgap fiber of the invention, the core is doped with a rare-earth element.

Preferably in the photonic bandgap fiber of the invention, the first cladding is surrounded by a second cladding of a material having a lower refractive index than the first cladding.

Preferably in the photonic bandgap fiber of the invention, the maximum relative index difference of the high-refractive-index portions that form the periodic structure is between 0.5% and 4.0%.

Preferably in the photonic bandgap fiber of the invention, a fiber grating is formed in the core.

Preferably in the photonic bandgap fiber of the invention, the high-refractive-index portions of the cladding do not have photosensitivity.

The invention also provides a fiber amplifier which uses the photonic bandgap fiber according to the invention as an optical amplification medium.

Preferably, the fiber amplifier of the invention employs an end-pumping scheme, whereby pump light is introduced from an end face of an amplification fiber.

Effect of the Invention

The photonic bandgap fiber of the invention includes a low-refractive-index region whose average refractive index is smaller than that of the core, provided in a core vicinity portion of the first cladding, and a periodic structure region wherein a great many high-refractive-index portions whose refractive index is higher than the first cladding are arranged in a periodic structure; therefore, when configured in a double-clad structure, pump light that is launched to the first cladding passes through the low-refractive-index region and reaches the core, where it can excite the rare-earth ions doped in the core, whereby the periodic structure region can achieve a wavelength filter effect, and the pump light can efficiently pump signal light.

Furthermore, since the fiber amplifier of the invention uses the photonic bandgap fiber of the invention, wherein the core is doped with a rare-earth element and which is arranged in a double-clad structure, as an optical amplification medium, the usage efficiency of pump light can be increased. By setting the size and arrangement of the high-refractive-index portions 33, and by setting the refractive index of the medium of the high-refractive-index portions 33 with respect to the refractive index of the first cladding 32 such as not to contain wavelengths among spontaneously emitted light in the transmission band which are not desired to be amplified by the photonic bandgap effect, it is possible to suppress amplification of unwanted spontaneously emitted light, and thereby easily modify the oscillation wavelength of the fiber laser and suppress stimulated Raman scattering.

BRIEF DESCRIPTION OF THE REFERENCE NUMERALS

Figure 1:
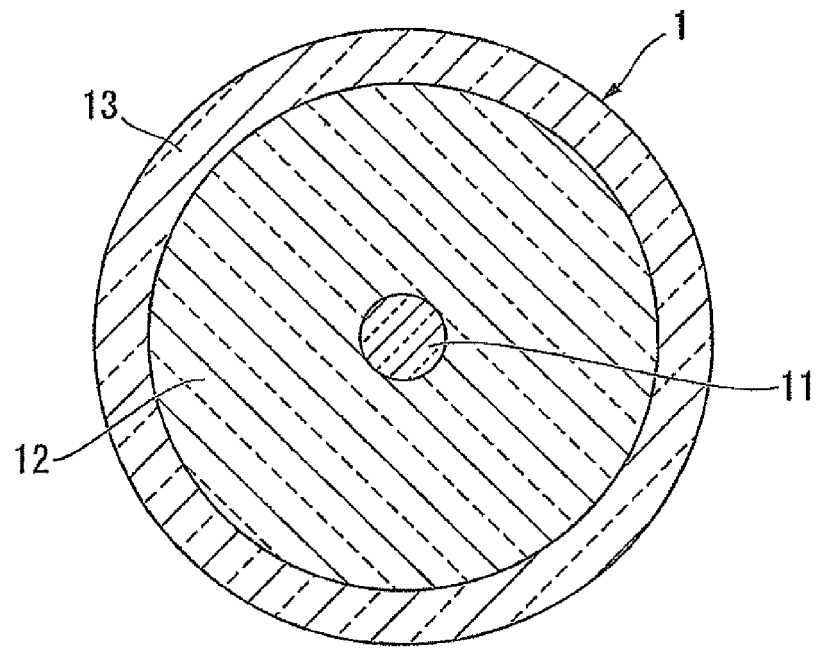
FIG. 1 is a cross-sectional view of an example of a conventional double-clad fiber.
Figure 2:
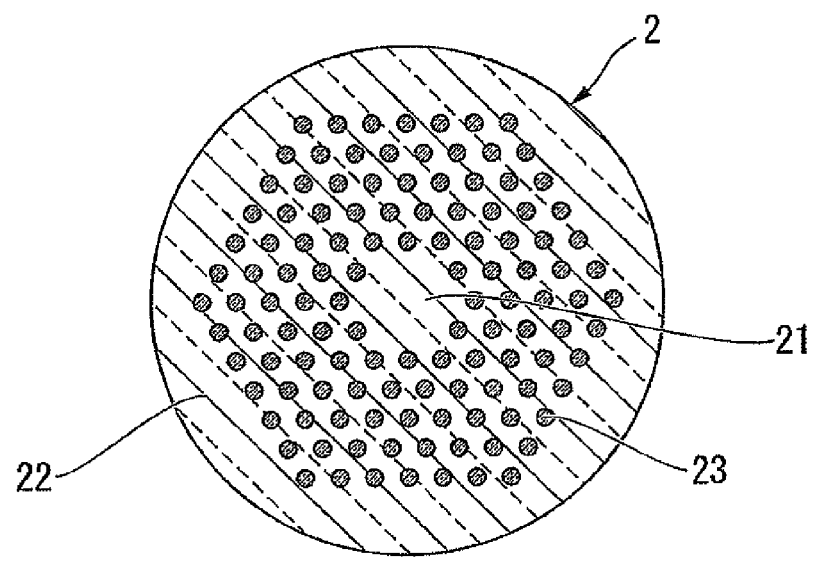
FIG. 2 is a cross-sectional view of an example of a conventional photonic bandgap fiber.

3 Photonic bandgap fiber
31 Core
32 First cladding
33 High-refractive-index portions
34 Low-refractive-index region
35 Second cladding
36 Stress-applying parts
81, 82 Fiber grating
83 Multimode laser
84 Beam-combiner

BEST MODES FOR CARRYING OUT THE INVENTION

Exemplary embodiments of the invention will be explained with reference to the drawings.

Figure 3:
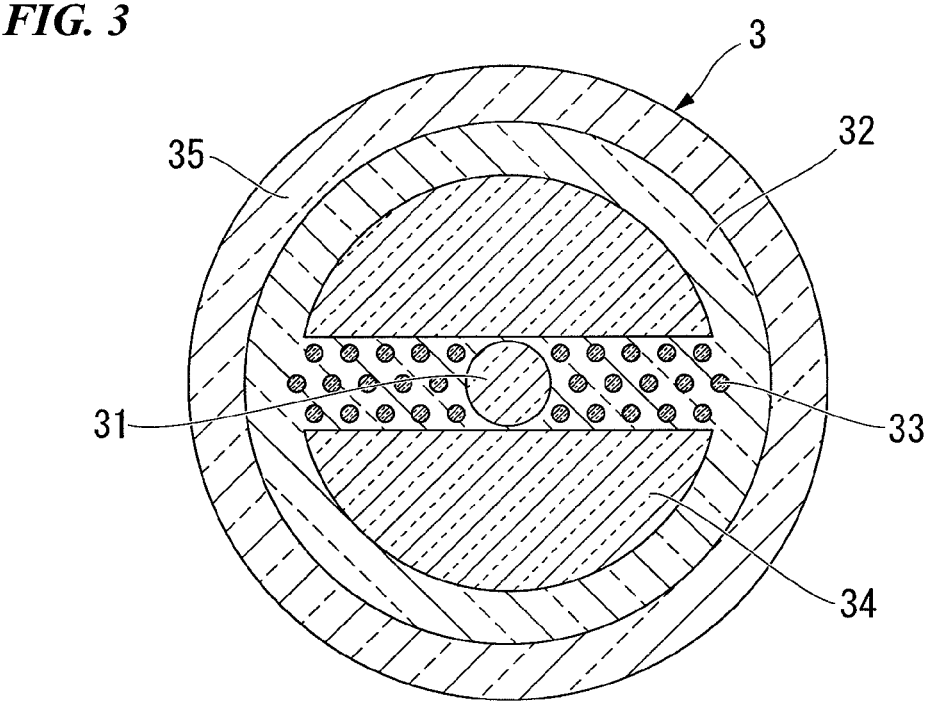
FIG. 3 is a cross-sectional view of a first embodiment of a photonic bandgap fiber according to the invention.

FIG. 3 is a cross-sectional view of a first embodiment of a photonic bandgap fiber according to the invention. A photonic bandgap fiber 3 of this embodiment includes a core 31 of solid material, a first cladding 32 arranged around the core 31, a low-refractive-index region 34 that is arranged in part of a core vicinity portion of the first cladding 32 and whose average refractive index is lower than that of the core, a periodic structure region that is arranged in another part of the core vicinity portion of the first cladding 32 which is made of a great many high-refractive-index portions 33 whose refractive index is higher than that of the first cladding 32 arranged in a periodic structure, and a second cladding 35 that is arranged around the first cladding 32 and is made of a material whose refractive index is lower than that of the first cladding 32.

In FIG. 3, when the refractive index of the core 31 is equal to or lower than that of the first cladding 32, since light passing through the core 31 is purely guided by the photonic bandgap effect in the direction surrounded by the periodic structure, a phenomenon wherein the electrical field of the mode propagating in the core couples with a mode propagating in the periodic structure and then recouples with the mode propagating in the core does not in principle occur, and a high filtering effect at a cutoff wavelength can be obtained.

While in the photonic bandgap fiber according to this embodiment, the refractive index of the core 31 is equal to or lower than the refractive index of the first cladding 32, it can be approximately 0.1% higher than the refractive index of the first cladding 32. In this case, the core 31 has a core mode having an equivalent refractive index that is equal to or lower than the refractive index of the core 31. When the equivalent refractive index of this core mode at the cutoff wavelength is larger than the refractive index of the first cladding 32, since the electrical field of this core mode mutually couples with the electrical field of a mode at the cutoff wavelength that propagates in the periodic structure, an electrical field that couples from the core mode to the mode propagating in the periodic structure exhibits a phenomenon of recoupling to the core mode. However, in the mode propagating in the periodic structure that can be coupled from the core mode, since the equivalent refractive index of the mode differs only by approximately 0.1% from the refractive index of the cladding and has weak confinement. Even when the bend diameter is extremely large that is unavoidable when using this photonic bandgap fiber, the confinement of the mode propagating in the periodic structure can be cancelled due to the bend loss, making it possible to obtain a high filtering effect at a cutoff wavelength. Specifically, if the refractive index of the core is between approximately 0.0% and 0.1%, a high filtering effect at a cutoff wavelength can be obtained.

In this embodiment, the core 31, the low-refractive-index region 34, the periodic structure region, and the first cladding 32 are each made of a silica based glass formed by doping pure silica glass with a refractive index-adjusting dopant such as fluorine and germanium oxide, and the second cladding 35 is made of a synthetic resin with a low refractive index. Incidentally, in the photonic bandgap fiber of this invention, the materials of the various parts are not limited to those shown in the examples.

For example, as disclosed in the specification of the U.S. Pat. No. 5,907,652, air or the like can be used as a material of the second cladding 35. In a structure using air as a material for the second cladding (hereinafter "air-clad structure"), the entire first cladding is supported by extremely thin glass, making it difficult to perform side-pumping by introducing pump light from the sides; therefore, end-pumping is often used. However, when using a conventional solid-core photonic bandgap fiber in an end-pumping double-clad structure, some of the pump light launched to the first cladding is guided by index-guiding in the periodic structure of the first cladding and is not transmitted to the core. Therefore, the pump light cannot be used efficiently. The solid-core photonic bandgap fiber of the invention is preferable in that, since the periodic structure in the first cladding only exists in part of the core periphery, the pump light can be used efficiently even when using an end-pumping scheme. The solid-core photonic bandgap fiber of the invention is preferably combined with an air-clad structure.

The photonic bandgap fiber 3 of this embodiment is a solid-core photonic bandgap fiber having a core 31 made of a solid material (silica based glass); this core 31 can be doped with a rare-earth element such as ytterbium and erbium.

The photonic bandgap fiber 3 of this embodiment has a completely solid structure with no air holes. Therefore, the structure of the photonic bandgap fiber 3 of this embodiment does not change due to collapsing air holes when fusion spliced to another optical fiber, enabling it to be fusion spliced with low loss. Incidentally, in the photonic bandgap fiber of the invention, air holes can be provided at positions other than the core.

The photonic bandgap fiber 3 of this embodiment includes, in a core vicinity portion of the first cladding 32, a periodic structure region that extends in band shape to the left and right of the core 31, and two semicircular low-refractive-index regions 34 arranged with the periodic structure region between them. In the photonic bandgap fiber of the invention, the structural arrangement of the periodic structure region and the low-refractive-index regions 34 is not limited to that shown in this example, and can be modified as appropriate.

In the photonic bandgap fiber 3 of this embodiment, the periodic structure region has a structure wherein, a great many high-refractive-index portions 33, which are small and circular in cross-section and have a higher refractive index than the first cladding 32, are arranged at a predetermined pitch in a triangular lattice structure, in a portion whose refractive index is the same as or similar to that of the first cladding 32. The structural arrangement of the high-refractive-index portions 33 of the photonic bandgap fiber of this embodiment is not limited to the one illustrated in this example.

Thus the photonic bandgap fiber 3 of this embodiment is a solid-core photonic bandgap fiber that includes low-refractive-index regions 34 whose average refractive index is lower than the refractive index of the core 31 and consequently realizes index-guiding, and a periodic structure region that realizes a waveguide using a photonic bandgap achieved with a periodic structure, these both being arranged in a core vicinity portion of the first cladding 32. When a part of the core vicinity portion is surrounded with the low-refractive-index regions 34 whose average refractive index is lower than the refractive index of the core 31, the difference in the refractive indexes produces a waveguide structure. Since the low-refractive-index regions 34 do not contain the periodic structure of the high-refractive-index portions 33, pump light that is launched to the first cladding 32 passes through the low-refractive-index regions 34 and easily reaches the core 31, where it can excite the rare-earth elements that are doped in the core 31. Therefore, the photonic bandgap fiber 3 of this embodiment can use pump light to efficiently amplify signal light.

On the other hand, since the periodic structure region that realizes a waveguide using a photonic bandgap is provided in another region of the core vicinity portion, the photonic bandgap fiber 3 of this embodiment still achieves the filter effect which is a characteristic of a photonic bandgap fiber. Therefore, if the refractive index of the medium of the high-refractive-index portions 33 with respect to the refractive index of the first cladding 32, and also the size and arrangement of these high-refractive-index portions 33, are set such that the transmission band by the photonic bandgap effect does not contain wavelengths that are not desired to be amplified among the spontaneously emitted light, it becomes possible to suppress the amplification of unwanted spontaneously emitted light, to easily change the oscillation wavelength of the fiber laser, and to suppress stimulated Raman scattering.

This makes it possible to easily change the oscillation wavelength of the fiber laser, and to suppress stimulated Raman scattering, by suppressing ASE.

As described above, according to the photonic bandgap fiber 3 of this embodiment, it is possible to realize a solid-core photonic bandgap fiber that has a wavelength filter effect, and, when arranged in a double-clad structure, allows pump light to efficiently pump signal light.

Also, since the cross-sectional structure of the photonic bandgap fiber 3 of this embodiment does not have three-fold rotational symmetry or higher, there is form birefringence. Moreover, when the thermal expansion coefficient of the medium constituting the high-refractive-index portions 33 is different from the thermal expansion coefficient of the medium constituting the first cladding 32 or the low-refractive-index regions 34, stress induces birefringence. Due to this birefringence, the fiber can be made to function as a polarization-maintaining fiber or single-polarization fiber, without providing a separate stress-applying part.

Figure 4:
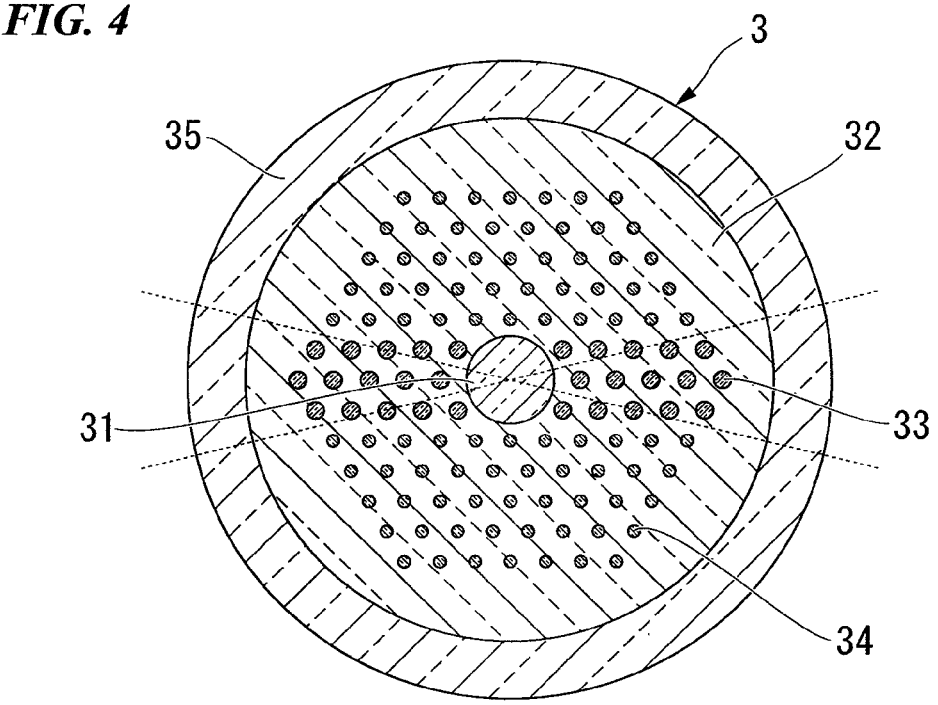
FIG. 4 is a cross-sectional view of a second embodiment of a photonic bandgap fiber according to the invention.

FIG. 4 is a cross-sectional view of a second embodiment of a photonic bandgap fiber of the invention. In FIG. 4, constituent elements similar to those of the photonic bandgap fiber 3 in the first embodiment shown in FIG. 3 are represented with the same reference numerals.

The photonic bandgap fiber 3 of this embodiment is characterized in that a great many low-refractive-index regions 34 are arranged in a triangular lattice structure in part of a core vicinity portion of the first cladding 32, and the equivalent refractive index when a first cladding region where the low-refractive-index regions are arranged is treated as a homogeneous medium equivalent thereto is lower than that of the core. The equivalent refractive index is determined according to the refractive index of the main medium forming the first cladding, the refractive index of the low-refractive-index regions arranged in the main medium, its size, its shape, and so on.

The photonic bandgap fiber 3 of this embodiment can obtain similar effects as those of the photonic bandgap fiber 3 of the first embodiment.

Moreover, in comparison with a fiber whose core is surrounded by a medium having a homogeneous refractive index, the photonic bandgap fiber 3 of this embodiment is preferable in that the number of core-modes and optical characteristics such as the mode field diameter or chromatic dispersion can be set more freely. It is also possible to provide air holes in the low-refractive-index regions 34, and to use a solid material having a low refractive index for these regions. It is preferable to use a solid material having a low refractive index since this ensures that there are no air holes in the first cladding portion surrounding the core, whereby deformation of the core portion during fusion splicing can be reduced, and so can connection loss.

Figure 5:
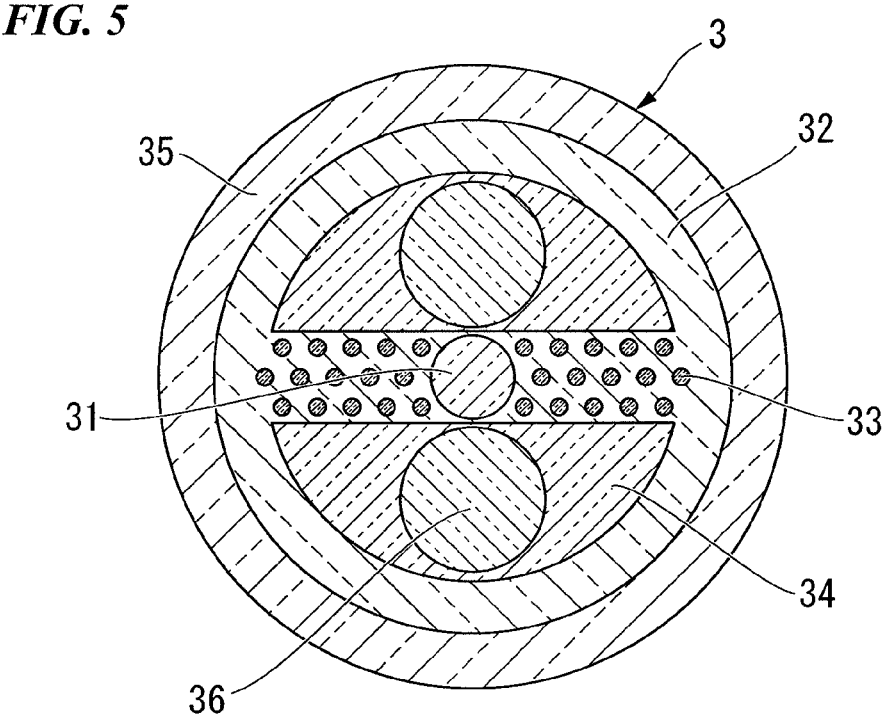
FIG. 5 is a cross-sectional view of a third embodiment of a photonic bandgap fiber according to the invention.

FIG. 5 is a cross-sectional view of a third embodiment of a photonic bandgap fiber of the invention. In FIG. 5, constituent elements which are similar to those of the photonic bandgap fiber 3 in the first embodiment shown in FIG. 3 are represented with the same reference numerals.

The photonic bandgap fiber 3 of this embodiment is characterized in that two stress-applying parts 36 are provided in the low-refractive-index regions 34 with the core 31 sandwiched between them. The stress-applying parts 36 can be formed from a material similar to that of stress-applying parts in a conventionally known stress-applying type polarization-maintaining fiber, such as, for example, silica glass doped with boron oxide.

The photonic bandgap fiber 3 of this embodiment can obtain effects similar to those of the photonic bandgap fiber 3 of the first embodiment.

By arranging the stress-applying parts 36 in the vicinity of the core 31, the photonic bandgap fiber 3 of this embodiment can also be made to function as a polarization-maintaining fiber or a single-polarization fiber.

Figure 6:
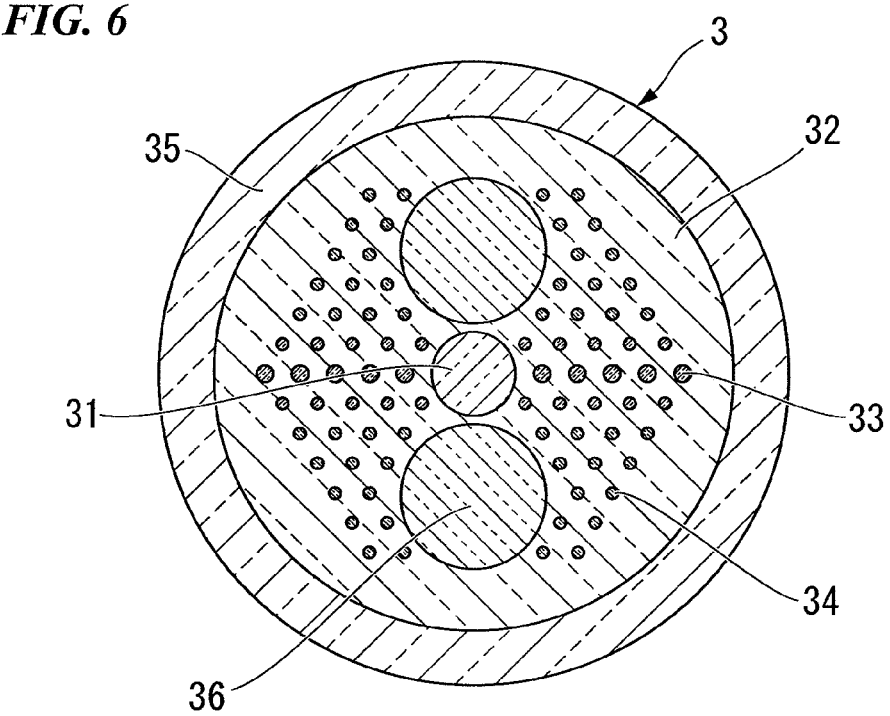
FIG. 6 is a cross-sectional view of a fourth embodiment of a photonic bandgap fiber according to the invention.

FIG. 6 is a cross-sectional view of a fourth embodiment of the photonic bandgap fiber of the invention. In FIG. 6, constituent elements similar to those of the photonic bandgap fiber 3 shown in FIG. 3 to FIG. 5 are represented with the same reference numerals.

The photonic bandgap fiber 3 of this embodiment has a structure wherein the refractive index of the stress-applying parts 36 is lower than the core 31, and the stress-applying parts 36 themselves can be used as part of the low-refractive-index regions 34.

In this embodiment, the high-refractive-index portions 33 are aligned such as to form a one-dimensional periodic structure on both sides of the core 31.

The photonic bandgap fiber 3 of this embodiment can obtain effects similar to those of the photonic bandgap fiber 3 of the first embodiment.

In addition, by arranging the stress-applying parts 36 in the vicinity of the core 31, the photonic bandgap fiber 3 of this embodiment can also be made to function as a polarization-maintaining fiber or a single-polarization fiber.

Figure 7:
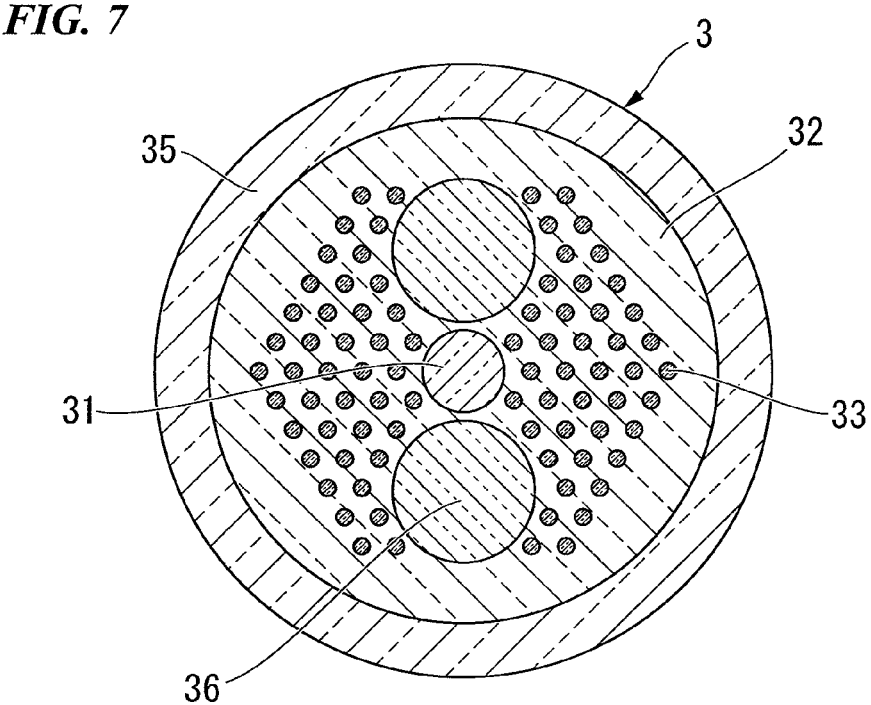
FIG. 7 is a cross-sectional view of a fifth embodiment of a photonic bandgap fiber according to the invention.

FIG. 7 is a cross-sectional view of a fifth embodiment of the photonic bandgap fiber of the invention. In FIG. 7, constituent elements similar to those of the photonic bandgap fiber 3 shown in FIG. 3 to FIG. 6 are represented with the same reference numerals.

The photonic bandgap fiber 3 of this embodiment uses only the two stress-applying parts 36 in the core vicinity portion with the core 31 sandwiched between them as the low-refractive-index regions, and does not include a separate low-refractive-index region.

The photonic bandgap fiber 3 of this embodiment can obtain effects similar to those of the photonic bandgap fiber 3 of the first embodiment.

In addition, by arranging the stress-applying parts 36 in the vicinity of the core 31, the photonic bandgap fiber 3 of this embodiment can also be made to function as a polarization-maintaining fiber or a single-polarization fiber.

Also, in the fiber structure of each of the above embodiments, by providing the low-refractive-index region 34 in the core vicinity portion, the symmetry of the fiber structure is disturbed, and it becomes possible to eliminate problems such as skew mode, which is often a problem in double-cad fibers.

Figure 9:
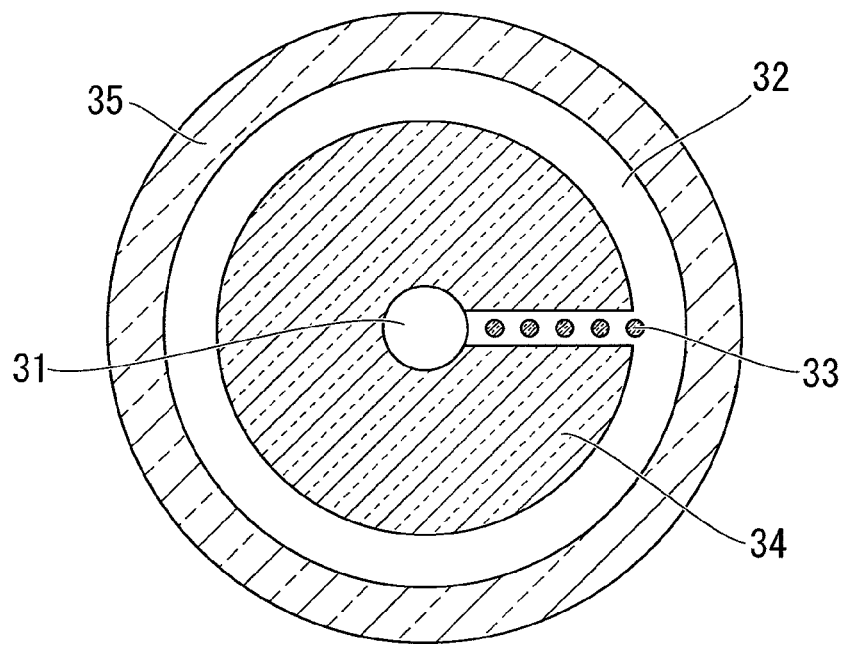
FIG. 9 is a cross-sectional view of a sixth embodiment of a photonic bandgap fiber according to the invention.

FIG. 9 is a cross-sectional view of a sixth embodiment of the photonic bandgap fiber of the invention. In FIG. 9, constituent elements similar to those of the photonic bandgap fiber 3 in the embodiments shown in FIG. 3 to FIG. 7 are represented with the same reference numerals.

In the photonic bandgap fiber of this embodiment, a one-dimensional periodic structure of the high-refractive-index portions 33 is arranged at one place, and the refractive index profile of the core 31 is extremely close to the concentric refractive index profile of a conventional optical fiber. Therefore, the mode field pattern of the photonic bandgap fiber of this embodiment is extremely close to the mode field shape of a conventional optical fiber, whereby the photonic bandgap fiber of this embodiment can reduce connection loss with a conventional optical fiber.

Figure 10:
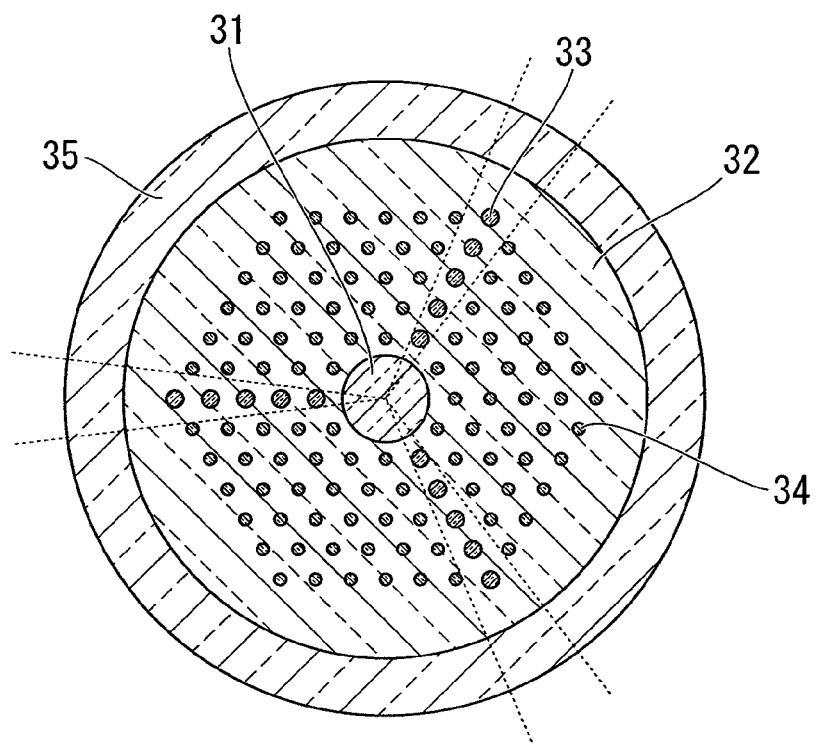
FIG. 10 is a cross-sectional view of a seventh embodiment of a photonic bandgap fiber according to the invention.

FIG. 10 is a cross-sectional view of a seventh embodiment of the photonic bandgap fiber of the invention. In FIG. 10, constituent elements similar to those of the photonic bandgap fiber in the embodiments shown in FIG. 3 to FIG. 7 and FIG. 9 are represented with the same reference numerals.

The cross-sectional structure of the photonic bandgap fiber shown in FIG. 10 has three-fold rotational symmetry or higher, and consequently there is no birefringence in principle. When a fiber has birefringence, for example, when a fiber grating is formed in the core of the fiber, the reflection and transmission characteristics will have polarization dependency, which, depending on the transmission system being used, might not be desirable. It is therefore preferable, where necessary, that the cross-sectional structure of the fiber has three-fold symmetry or higher, such that it does not have birefringence.

In the fiber structure of each of the embodiments described above, the high-refractive-index portions 33, the low-refractive-index regions 34, the stress-applying parts 36, and so on are arranged in a core vicinity portion, the symmetry of the fiber structure is disturbed, and thereby eliminating problems such as skew mode, which is often a problem in double-clad fibers.

The fiber structure of each of the embodiments described above is preferable in that, since a periodic refractive index-modulation structure in the longitudinal direction of the core is achieved by forming a fiber grating at the core, it is possible to form a resonator structure that is often necessary in a fiber laser without providing a separate optical component. In silica based glass, while the refractive index is increased by doping the core with germanium and the like, codoping of fluorine and boron enables the refractive index to be adjusted while maintaining photosensitivity.

When giving the core 31 photosensitivity and writing a fiber grating, it is preferable if photosensitivity is not given to the high-refractive-index portions 33 of the cladding, since, when forming a grating (periodic structure of refractive index in the longitudinal direction) at the core 31, grating is not formed in the high-refractive-index portions 33 and unwanted reflection and the like can be prevented. In silica based glass, by using aluminum as a dopant to increase the refractive index of the high-refractive-index portions 33, high-refractive-index portions with no photosensitivity can be manufactured.

Effects of the invention will now be demonstrated with examples.

EXAMPLES

First Example

A photonic bandgap fiber 3 having the structure shown in FIG. 3 was made. A core 31 has a relative index difference to pure silica glass $\Delta c$ of −0.02% and a diameter d of 25 μm, and is surrounded by a first cladding 32 of pure silica glass with a diameter of 250 μm. Around the core 31 are a periodic structure region made of high refractive index portion 33 having a relative index difference to pure silica glass $\Delta h$ of 1.6% and a diameter dh of 6.8 μm, arranged in a triangular lattice structure at a period of 17.0 μm, and a low-refractive-index region 34 which has a relative index difference to pure silica glass $\Delta 1$ of −0.1%.

To position the core 31, the low-refractive-index region 34 has a five-layer structure wherein two layers from the center are removed.

A second cladding 35 is formed around the first cladding, and is coated with a fluorine resin whose relative index difference differs from that of pure silica glass by −0.5%.

The core 31 is doped with ytterbium, and its absorption when the entire first cladding is pumped by light having a wavelength of 915 nm was 0.7 dB/m, which is hardly different from that of a normal double-clad fiber. The reason is that, since parts where there is no periodic structure having a higher refractive index than the core are provided around the core, pump light that is launched to the first cladding can easily reach the core.

Figure 8:
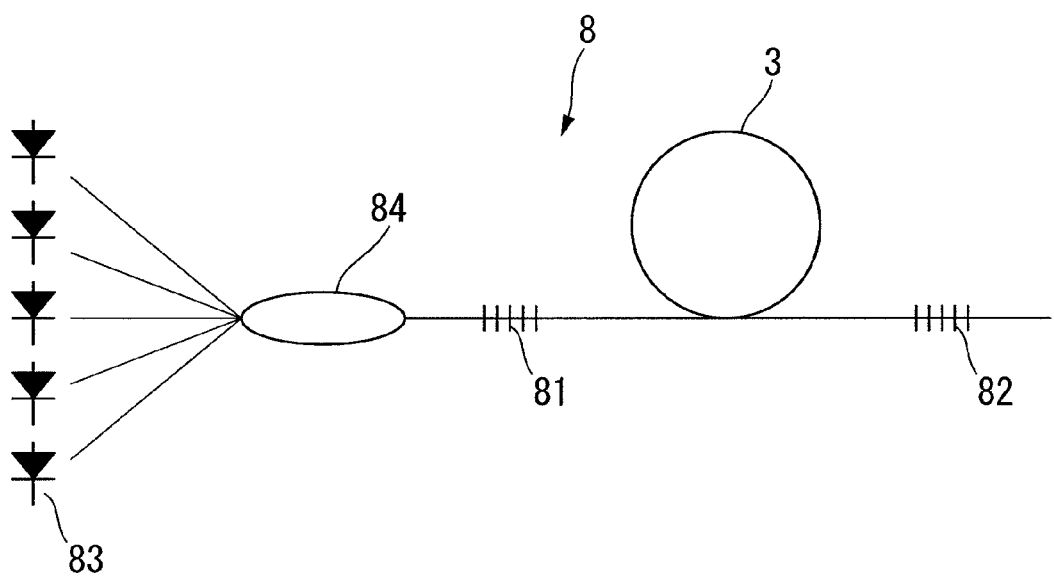
FIG. 8 is a configuration view of a fiber laser as an example of a fiber amplifier according to the invention.

Using this photonic bandgap fiber 3, a fiber laser 8 shown in FIG. 8 was made. On both sides of the photonic bandgap fiber 3, a fiber grating 81 that reflects more than 99% of light with a wavelength of 1160 nm, and a fiber grating 82 that reflects 30% of light with a wavelength of 1160 nm were fusion spliced. The optical fiber where the fiber grating 81 is formed is coated by a fluorine resin whose relative index difference to pure silica glass is −5%, and has a double-clad structure. Five multimode lasers 83 with wavelength 915 nm and output 5 W are provided before the fiber grating 81; when the fiber laser was oscillated by an end-pumping scheme using a beam-combiner 84, a stable output of 13 W at wavelength of 1160 nm was achieved.

While, since the gain peak of a ytterbium-doped fiber laser is between 1040 to 1060 nm, it is usually extremely difficult to stably oscillate light at 1160 nm while suppressing parasitic oscillations near 1040 to 1060 nm, the photonic bandgap fiber of this embodiment has a filter effect of removing lights at wavelengths equal to or greater than 1000 nm to 1100 nm guided in the core, and it was consequently possible to stably oscillate light at 1160 nm. Further, since the low-refractive-index region 34 that does not contain high-refractive-index portions 33 is provided around the core 31 in portions other than the periodic structure region that contains the high-refractive-index portions 33, even when an end-pumping scheme is employed, pump light launched to the first cladding 32 can easily reach the core 31, and the usage efficiency of the pump light can be increased to a high value of more than 50%.

Second Example

Figure 11:
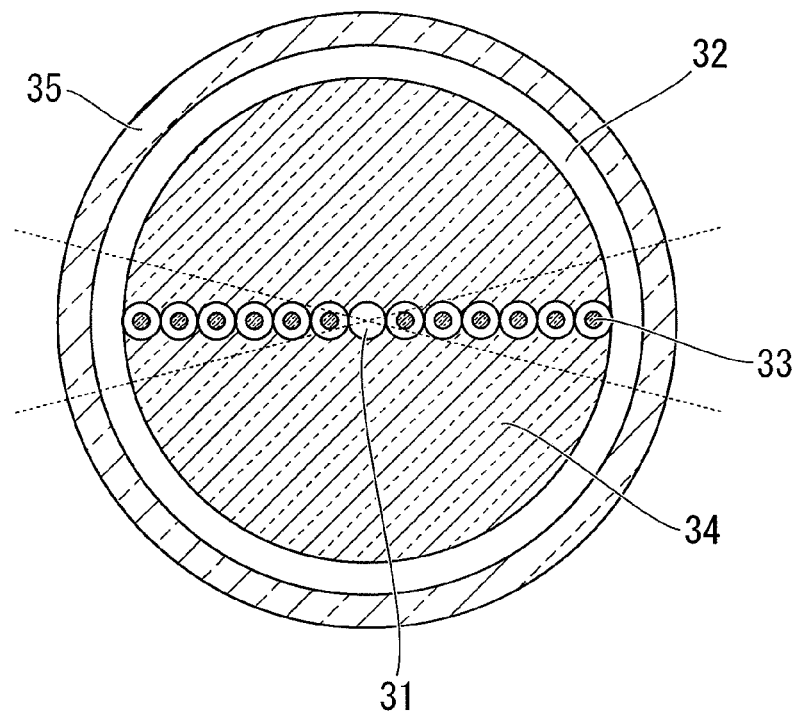
FIG. 11 is a cross-sectional view of a structure of a photonic bandgap fiber manufactured in an example according to the invention.

A photonic bandgap fiber having the structure shown in FIG. 11 was made. A core 31 has a relative index difference to pure silica glass $\Delta c$ of 0% and a diameter d of 7.3 μm, and is surrounded by a first cladding 32 of pure silica glass with a diameter of 135 μm. Around the core 31 are a periodic structure region, in which high-refractive-index portions 33 that are made by doping pure silica glass with germanium, and have a maximum relative index difference to pure silica glass $\Delta h$ of 2.8% and a diameter dh of 3.7 μm are arranged in a row at a period of 7.3 μm, and a low-refractive-index region 34 which is made by doping pure silica glass with fluorine and has a relative index difference to pure silica glass $\Delta 1$ of −0.35%.

To position the core 31, the periodic structure region has a six-layer periodic structure with one central layer removed.

A second cladding 35 is formed around the first cladding 32, and is covered with a fluorine resin whose refractive index differs from that of pure silica glass by −5%.

The core 31 is doped with ytterbium, and its absorption when the entire first cladding is pumped by light having a wavelength of 915 nm was 0.4 dB/m, which is hardly different from that of a normal double-clad fiber. The reason is that, since the periodic structure having a higher refractive index than the core 31 does not exist in some regions from around the core 31 toward the outer peripheral direction of the fiber, even if an end-pumping scheme is employed, pump light that is launched to the first cladding 32 can easily reach the core 31.

Figure 12:
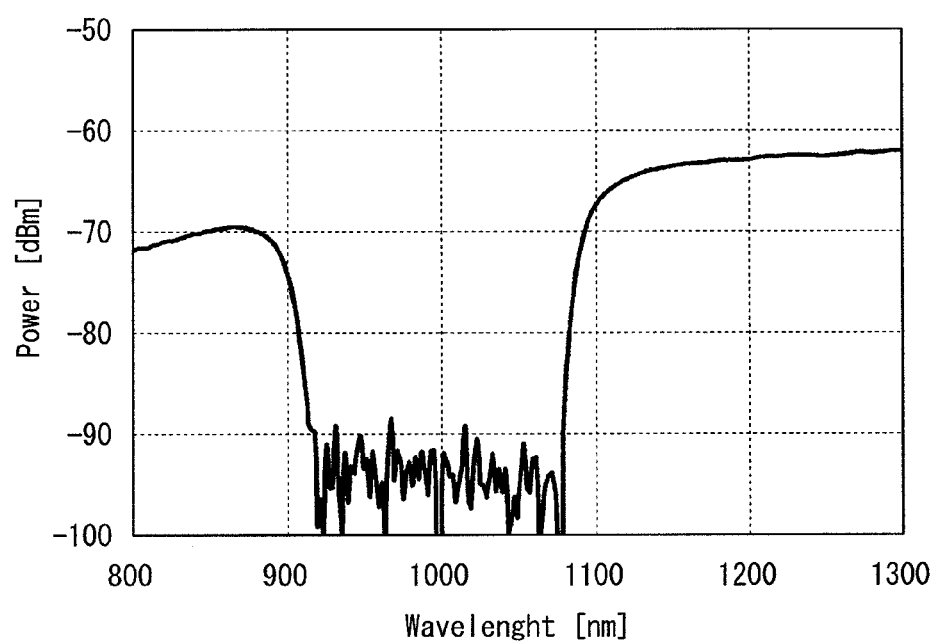
FIG. 12 is a graph of measurements of a transmission spectrum in the photonic bandgap fiber of FIG. 11.

In addition to the photonic bandgap fiber having the structure shown in FIG. 11, there was also manufactured a photonic bandgap fiber having a similar structure, but with a core that was not doped with ytterbium, and wherein a portion around the first cladding was coated with an ultraviolet-curable resin whose refractive index is higher than that of the first cladding. FIG. 12 is a transmission spectrum when 2 meters of this fiber was wound to a diameter of 60 mm, and the core was subjected to end-face excitation from a white light source.

Adding a bend to a photonic bandgap fiber induces loss at both the short wavelength edge and long wavelength edge of the transmission band. Accordingly, by adding an appropriate bend to the fiber, it is possible to make the transmission band narrower, and to increase loss at the cut-off wavelength. While in this embodiment, a greater suppression effect at wavelengths equal to or lower than 1100 nm is achieved by winding the fiber to a diameter of 60 mm, the transmission band can be extended to a short wavelength of approximately several tens of nm by increasing this bend diameter, or the transmission band can be reduced to a long wavelength of approximately several tens of nm by further reducing the bend diameter.

As clearly shown by the measurements in FIG. 12, even when the periodic structure of high-refractive-index portions 33 has only one row as shown by way of example in FIG. 11, a remarkably excellent wavelength suppression effect of 20 dB/m at equal to or less than 1100 nm is obtained. To increase the usage efficiency of pump light in a double-clad structure, in the cross-sectional structure of the fiber, the proportion of the region containing high-refractive-index portions 33 in the circumferential area around the core 31 should preferably be as small as possible. Therefore, as shown in FIG. 11, it is preferable that the periodic structure of the high-refractive-index portions 33 is reduced to a minimum, while increasing the low-refractive-index regions as much as possible. Specifically, if the structure is one where, of the 360 degrees around the core portion, equal to or more than 180 degrees, preferably equal to or more than 240 degrees, and more preferably equal to or more than 300 degrees, are surrounded by the low-refractive-index region, it will be possible to increase the usage efficiency of the pump light in a double-clad structure.

As shown in FIG. 12, lights with wavelengths equal to or less than 1100 nm are suppressed, whereas lights with wavelengths equal to or greater than 1100 nm propagate. Therefore, the photonic bandgap fiber with the structure shown in FIG. 11 can use the filter effect to remove ASE with wavelengths of 1000 nm to 1100 nm that are guided in the core, and stably oscillate lights at wavelengths equal to or greater than 1100 nm.

Furthermore, since the high-refractive-index portions 33 of the photonic bandgap fiber having the structure shown in FIG. 11 are doped with more germanium than the first cladding 32 and the low-refractive-index regions 34, the thermal expansion coefficient of the high-refractive-index portions 33 differs considerably from the thermal expansion coefficients of the first cladding 32 and the low-refractive-index region 34. Also, since the cross-sectional structure has only two-fold rotational symmetry or lower, even without providing a separate stress-applying part, the asymmetric thermal stress that is induced at the core by the high-refractive-index parts 33 achieved birefringence of equal to or more than $1\times10^{-4}$ at wavelength 1180 nm, and the fiber functioned as a polarization-maintaining fiber.

While this example used germanium as a dopant for the high-refractive-index parts, it is acceptable to use another dopant which has a different thermal expansion coefficient to pure silica and can increase the refractive index by doping it into pure silica, such as aluminum or phosphorus. A dopant which, while having a different thermal expansion coefficient to pure silica, reduces the refractive index by doping it into pure silica, such as fluorine or boron can be used only when these dopants are codoped with one of the dopants mentioned above which increase the refractive index, such as germanium, aluminum, or phosphorus.

In this example, since the low-refractive-index regions 34 is doped with fluorine, the thermal expansion coefficient of the core portion differs from that of the low-refractive-index portions in a precise sense, however, when the amount of fluorine doped is such that the relative index difference $\Delta 1$ does not satisfy −0.5%, as in this example, the low-refractive-index portions do not induce enough thermal stress for functioning as a polarization-maintaining fiber (p.m.f.), and the thermal stress required to make the fiber as a p.m.f. is provided by the high-refractive-index portions 33.

Using 16 meters of the photonic bandgap fiber 3 having the structure shown in FIG. 11 manufactured in the manner described, after winding it to a diameter of 60 mm, a fiber laser having a configuration similar to that shown in FIG. 8 was made. On both sides of the photonic bandgap fiber, a polarization-maintaining fiber grating 81 that reflects equal to or more than 99% of light with a wavelength of 1180 nm, and a polarization-maintaining fiber grating 82 that reflects 30% of light with a wavelength of 1180 nm were fusion spliced, with the birefringence axes of these polarization-maintaining fiber gratings being aligned with the birefringence axes of the photonic bandgap fiber. The optical fiber where the polarization-maintaining fiber grating 81 is formed is coated by a fluorine resin whose relative index difference to pure silica glass is −5%, and has a double-clad structure. Since a polarization-maintaining fiber generally has different bend loss at the same wavelength depending on polarization, by optimizing its structure it can be made to function as a single-polarization fiber or as a polarizer. In this example, the polarization-maintaining fiber where the polarization-maintaining fiber grating 82 is drawn is structured such that, of the two orthogonal polarizations at wavelength 1180 nm when the fiber is bend to a diameter of 60 mm, bend loss is generated only at one of the polarizations, the fiber laser thus functioning as a polarizer for the fiber laser oscillating in a single polarization. Five multimode lasers 83 with wavelength 915 nm and output 5 W are then provided before the fiber grating 81, and, when the fiber laser was oscillated by end pumping using a beam-combiner 84, a stable single-polarized output of 10 W at wavelength 1180 nm was obtained.

In addition to the photonic bandgap fiber having the structure shown in FIG. 11, there was also manufactured a photonic bandgap fiber having a similar structure, but with a core that was not doped with ytterbium, and wherein a portion around the first cladding was coated with an ultraviolet-curable resin whose refractive index is higher than that of the first cladding; ten meters of this photonic bandgap fiber was wound to a diameter of 60 mm, and the entire first cladding was pumped with laser light having a launch NA of 0.46 to the fiber, wavelength 915 nm, and output 7 W. Under these oscillation conditions, light other than that guided in the high-refractive-index portions is radiated to the ultraviolet-curable resin around the first cladding, whereby the quantity of light guided in the high-refractive-index portions can be ascertained. In tests, light output after being guided through a high-refractive-index portions was 0.1 W. Therefore, the proportion of pump light that cannot be used efficiently in exciting the core portion for guiding in the high-refractive-index portions is just 1.5%, clearly showing that when the photonic bandgap fiber of this structure is used as a double-clad fiber, it can efficiently use pump light.

Figure 13:
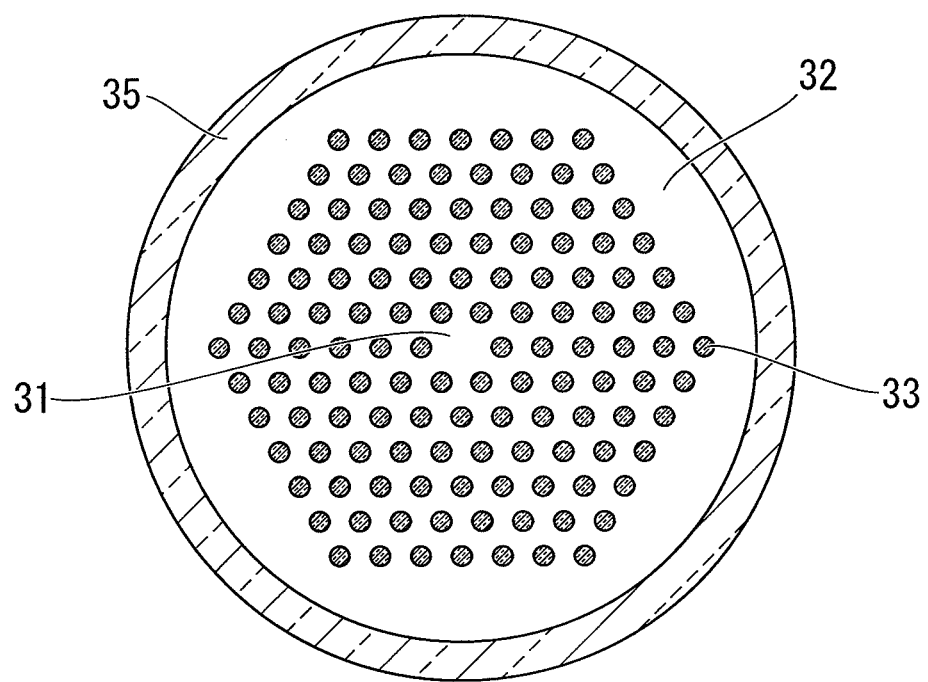
FIG. 13 is a cross-sectional view of a structure of a photonic bandgap fiber wherein a core is entirely surrounded by high-refractive-index portions.

A fiber having the same parameters as the photonic bandgap fiber shown in FIG. 11, excepting that its core is entirely surrounded by high-refractive-index portions as shown in FIG. 13, was made; when the entire first cladding was pumped under similar pumping conditions, light that was output after guiding through the high-refractive-index portions was 1.05 W, and constituted 15% of all the incident pump light. Therefore, it can be understood from this that the photonic bandgap fiber having the structure shown in FIG. 13, when used as a double-clad fiber, has a lower usage efficiency of pump light than the photonic bandgap fiber having the structure shown in FIG. 11.

As another embodiment of the photonic bandgap fiber of the invention, a photonic bandgap fiber that was the same as the fiber of the second embodiment, excepting that its core had a relative index difference to pure silica glass Δc of 0.1%. In this case, the core 31 has a core mode with an effective refractive index that is equal to or lower than the refractive index of the core 31. When the effective refractive index of this core mode at the cut-off wavelength is larger than the refractive index of the cladding 32, since the electrical field of this core mode mutually couples with the electrical field of a mode at the cut-off wavelength that propagates in the periodic structure, an electrical field that couples from the core mode to the mode propagating in the periodic structure exhibits a phenomenon of recoupling to the core mode. However, in the mode propagating in periodic structure that is coupled from the core mode, since the effective refractive index of the mode differs by less than 0.1% from the refractive index of the cladding and has weak confinement, even when there is bend loss at an extremely large bend diameter that is unavoidable when using this photonic bandgap fiber, the confinement of the mode propagating in the periodic structure can be cancelled due to the bend loss. The photonic bandgap fiber of this example actually exhibited optical characteristics similar to those of the photonic bandgap fiber of the second embodiment.

INDUSTRIAL APPLICABILITY

It is an object of the invention to provide a solid-core photonic bandgap fiber which, when arranged in a double-clad structure, can use pump light to efficiently pump signal light.

The invention claimed is:

1. A photonic bandgap fiber comprising:
a core of a solid material;
a first cladding provided around the core;
a low-refractive-index region provided in a part of a core vicinity portion of the first cladding and whose average refractive index is lower than that of the core; and
a periodic structure region that is arranged in another part of the core vicinity portion of the first cladding which is made of a great many high-refractive-index portions whose refractive index is higher than that of the first cladding arranged in a periodic structure, wherein
the core is doped with a rare-earth element, and
the first cladding is surrounded by a second cladding of material having a lower refractive index than the first cladding such that the propagation of undesired spontaneously emitted light at a peak-gain wavelength of the rare-earth element, or stimulated Raman scattering, is suppressed, and
there are no air holes in the first cladding.

2. The photonic bandgap fiber according to claim 1, wherein the refractive index of the core is equal to or lower than the refractive index of the first cladding.

3. The photonic bandgap fiber according to claim 1, wherein the high-refractive-index portions of the periodic structure are arranged as at least one of a one-dimensional periodic structure, a triangular lattice structure, a honeycomb lattice structure, a square lattice structure, and a rectangular lattice structure.

4. The photonic bandgap fiber according to claim 1, wherein the cross-sectional structure has only two-fold rotational symmetry or lower, and functions as a polarization-maintaining fiber or a single-polarization fiber.

5. The photonic bandgap fiber according to claim 1, wherein stress-applying parts are provided in the core vicinity portion of the first cladding, and this photonic bandgap fiber functions as a polarization-maintaining fiber or a single-polarization fiber.

6. The photonic bandgap fiber according to claim 4, wherein the high-refractive-index portions function as stress-applying parts, and stress-applying parts are not separately provided.

7. The photonic bandgap fiber according to claim 1, wherein the cross-sectional structure has three-fold rotational symmetry or higher, and there is no birefringence.

8. The photonic bandgap fiber according to claim 1, wherein the maximum relative index difference of the high-refractive-index portions that form the periodic structure is between 0.5% and 4.0%.

9. The photonic bandgap fiber according to claim 1, wherein a fiber grating is formed in the core.

10. The photonic bandgap fiber according to claim 9, wherein the high-refractive-index portions of the first cladding do not have photosensitivity.

11. A fiber amplifier which uses the photonic bandgap fiber according to claim 1 as an optical amplification medium.

12. The fiber amplifier according to claim 11, employing an end-pumping scheme, whereby pump light is introduced from an end face of an amplification fiber.

13. The photonic bandgap fiber according to claim 2, wherein the high-refractive-index portions of the periodic structure are arranged as at least one of a one-dimensional periodic structure, a triangular lattice structure, a honeycomb lattice structure, a square lattice structure, and a rectangular lattice structure.

* * * * *